(12) United States Patent
Lobregt et al.

(10) Patent No.: US 8,253,723 B2
(45) Date of Patent: Aug. 28, 2012

(54) METHOD TO VISUALIZE CUTPLANES FOR CURVED ELONGATED STRUCTURES

(75) Inventors: Steven Lobregt, Eindhoven (NL); Hubrecht Lambertus Tjalling De Bliek, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 725 days.

(21) Appl. No.: 11/917,942

(22) PCT Filed: Jun. 13, 2006

(86) PCT No.: PCT/IB2006/051887
§ 371 (c)(1),
(2), (4) Date: Dec. 18, 2007

(87) PCT Pub. No.: WO2006/136971
PCT Pub. Date: Dec. 28, 2006

(65) Prior Publication Data
US 2010/0214283 A1    Aug. 26, 2010

(30) Foreign Application Priority Data
Jun. 22, 2005    (EP) .................................. 05105522

(51) Int. Cl.
*G06T 15/00* (2011.01)
(52) U.S. Cl. ........................ 345/419; 345/420
(58) Field of Classification Search .................. None
See application file for complete search history.

(56) References Cited

U.S. PATENT DOCUMENTS

| | | | |
|---|---|---|---|
| 5,430,308 A * | 7/1995 | Feichtner et al. | 250/580 |
| 5,699,799 A | 12/1997 | Xu et al. | |
| 6,143,008 A | 11/2000 | Eaves, III | |
| 6,212,420 B1 | 4/2001 | Wang et al. | |
| 6,728,566 B1 | 4/2004 | Subramanyan et al. | |
| 6,807,292 B1 * | 10/2004 | Goto et al. | 382/128 |
| 2002/0193687 A1 | 12/2002 | Vining et al. | |

FOREIGN PATENT DOCUMENTS
WO    0045326    8/2000

OTHER PUBLICATIONS

Raman Raghav et al: "Automated Generation of Curved Planar Reformations", Radiology, vol. 223, No. 1, pp. 275-280, 2002, XP002363485.
Kanitsar A et al:: "CPR—Curved Planar Reformation", Institute of Electrical and Electronics Engineers VIS 2002, IEEE Visualization 2002 Proceedings, Annual IEEE Conference on Visualization, pp. 37-44, XP010633273.
Holmes III, D.R and Robb, R.A: "Processing, Segementation and Visualization", Proceedings of the SPIE, Conference on Image Display, vol. 3335, pp. 72-82, 1998, XP002406210.
Saroul L et: "Exploring curved anatomic structures with surface sections". AL Institute of Electrical and Electronics Engineers VIS 2003. IEEE Visualization 2003 Proceedings, Annual IEEE Conference on Visualization, pp. 27-34, XP010671733.

* cited by examiner

*Primary Examiner* — Said Broome

(57) ABSTRACT

A method for visualization and inspection of elongated curved structures is disclosed. According to an embodiment improved inspection of elongated three dimensional (3D) curved structures such as blood vessels in a 3D medical image is disclosed. Rendering is performed such that it results in the visualization of a (3D) curved cutplane of said curved elongated structure. The advantages of this method are for instance that the cutplane information is interpreted easily in relation to the three-dimensional shape and surroundings of the elongated object, without distortions, and that cutplanes along more than one structure can be visualized and examined together at the same time, without interpretation problems for diagnosis and therapy of anomalies in e.g. the blood vessels.

14 Claims, 3 Drawing Sheets

METHOD TO VISUALIZE CUTPLANES FOR CURVED ELONGATED STRUCTURES

This invention pertains in general to the field of visualization and inspection of elongated curved three dimensional (3D) structures. More particularly the invention relates to a method for such visualization, preferably from three-dimensional (3D) medical images, enabling improved inspection of the elongated curved structures.

It is known to isolate anatomical structures in three-dimensional data sets from surrounding structures by using segmentation methods. After isolating the volume that belongs to the anatomical structure, which is under inspection, it can be visualized, e.g. on a display or a printout, using a rendering technique.

Cutplanes through the volume can be interpolated to show the distribution of measured values at the cross-section where the cutplane cuts through the structure of interest. When the structure is segmented, a centerline can be determined and cutplanes can be positioned perpendicular to this centerline. Another option is to interpolate a cutplane that follows the centerline of such a structure, wherein that cutplane is visualized in a flattened plane. See for instance "Armin Kanitsar, CPR—Curved Planar Reformation, IEEE Visualization 2002".

Visualization of tubular structures such as blood vessels is an important topic in medical imaging disclosing a way to display tubular structures for diagnostic purposes by generating longitudinal cross-sections in order to show their lumen, wall, and surrounding tissue in a curved plane.

Tubular elements to be inspected are for instance blood vessels, e.g. coronaries or carotids, or the large vessels in the extremities, suffering from stenosis to be detected for subsequent treatment. Other examples are the inspection of aortic aneurisms or pulmonary diseases, e.g. due to bronchial anomalies. For these applications, it is not sufficient to visualize and inspect cross-sections through the structure in a direction perpendicular to the centerline because an adequate impression of the location and nature of any existing problems of the tubular structure is not readily available. It is required to interpret the measured properties in relation to the position along the centerline.

A cutplane following a centerline is usually represented as a flattened plane, which results in a disadvantageous deformation. The cutplane may be further distorted by 'straightening' the elongated structure so that it runs for instance vertically through the displayed cutplane. This will only increase the described interpretation problems. Interpretation problems will also increase when a movie is shown of such a cutplane while rotating it around the centerline of the structure of interest, which is often done to inspect cross-sections in different directions through the structure. Distortion of the cutplane will in this case be variable as a function of the viewing direction. The plane, as shown in FIG. 1, is curved in one direction and flat in the other. FIG. 1 shows, on the left side, the principle of putting a cutplane, which is curved in one direction and flat in the other, through the centerline of a vessel. On the right side FIG. 1 shows the flattened representation of such a cutplane through vessels in a real clinical situation. The distortion of the visible anatomy in this flattened image is obvious. An additional shortcoming of this is that such a plane cannot follow more than one curved structure at the same time. When longitudinal cross-sections through two or more curved structures need to be visualized together, it is possible to curve the plane in such a way that it follows both centerlines. This can be done, however, in many different ways, and the result is extremely difficult to interpret. An illustrative example is given in FIG. 2, showing a curved cutplane through multiple vessel centerlines, which is shown as a flattened plane.

Hence, current visualization techniques show cross-sections through elongated curved structures, like blood vessels, as flattened structures in images. Furthermore, the images are often also straightened out, so that the central axis of the elongated curved structure becomes a straight line in such an image. This means that the geometry in the shown flat/straightened image is greatly distorted, which makes interpretation of the visible anatomical structures in such an image extremely difficult. Hence, an improved solution for visualizing cross-sections through elongated curved structures, without the drawback of strongly decreased interpretability because of geometric distortion of the presented information, would be advantageous. It would also be advantageous to even improve the interpretability by improved visualization of elongated curved structures and showing the three-dimensional context of the curved elongated structures.

Accordingly, the present invention preferably seeks to mitigate, alleviate or eliminate one or more of the above-identified deficiencies in the art and disadvantages singly or in any combination and solves at least the above mentioned problems by providing a method, a medical workstation, a computer-readable medium comprising a computer program, a medical image and a use of said method, according to the appended patent claims. According to a first aspect of the invention, a method of visualizing a curved elongated three dimensional (3D) structure comprised in a 3D data set, such as a medical 3D image, is provided. The method comprises providing a curved cutplane in said 3D data set cutting at least partly through said curved elongated three dimensional structure and following a path substantially along said three dimensional structure, and rendering an image from said 3D data set for visualizing said curved elongated three dimensional structure such that said rendered image comprises said curved cutplane.

According to another aspect of the invention, a medical workstation is provided. The workstation is configured for visualizing a curved elongated three dimensional (3D) structure comprised in a 3D medical image, and comprises means for providing a curved cutplane in said 3D data set cutting at least partly through said curved elongated three dimensional structure and following a path substantially along said three dimensional structure, and means for rendering an image from said 3D data set for visualizing said curved elongated three dimensional structure such that said rendered image comprises said curved cutplane.

According to a further aspect of the invention, a computer-readable medium having embodied thereon a computer program for visualizing a curved elongated three dimensional (3D) structure comprised in a 3D data set, such as a medical 3D image, for processing by a computer, e.g. comprised in the above mentioned workstation. The computer program comprises a code segment for providing a curved cutplane in said 3D data set cutting at least partly through said curved elongated three dimensional structure and following a path substantially along said three dimensional structure, and a code segment for rendering an image from said 3D data set for visualizing said curved elongated three dimensional structure such that said rendered image comprises said curved cutplane. According to yet another further aspect of the invention, a medical image is provided, that comprises a visualization of a curved cutplane rendered according to the method according to said first aspect of the invention.

The method according to an aspect of the invention may be used for computer assisted detection, inspection, and quantification of abnormalities, planning and preparation of subsequent interventions, such as for inspecting and/or detecting stenosis, aortic aneurisms or bronchial anomalies for subsequent treatment.

For a more thorough understanding of the present invention, the term "rendering" is explained in more detail hereinafter.

According to a commonly used definition, rendering is defined as the conversion of a high-level object-based description into a graphical image for display. This definition of rendering applies to rendering of objects, which may be synthesized/computer generated or measured from the real world, and which are characterized by a geometrical description, for instance a triangulated surface describing the shape of an object. This kind of object is also used in medical imaging, where such an object description may be derived from the measured patient data. This data is for instance obtained with a CT or MRI scanner and consists of a three-dimensional array of measurements related to spatial positions on a regular grid of measurements. These measurements are called voxels and the three-dimensional volume covered by a voxel array maps to a particular volume in the real world space, containing part of a patients body.

Instead of first extracting object shapes from the measured volume and describing these shapes with geometrical descriptions (triangulated surfaces), the contents of the measured volume may also be visualized directly from the voxel values. The first approach is called surface rendering and the second is called volume rendering. Both techniques are commonly used in many variations and have their own advantages and disadvantages. However, the result of both approaches is a rendering of at least part of the contents of a measured volume in the form of an image, generally two-dimensional, giving an impression of a projected three-dimensional scene, or a window through which one views the three-dimensional scene inside the measured volume. An alternative way of displaying a rendered image is for instance the use of a 3D display. In this case the rendered image creates the impression of a 3D image, e.g. by overlaying several two dimensional images that are arranged to give the three dimensional impression. To experience such a 3D effect, generally a special hardware is needed, such as 3D glasses (e.g. red/green or red/cyan) or a 3D display to view the 3D images properly.

The advantages of the present invention are for instance that the cutplane information is interpreted easily in relation to the three-dimensional shape and surroundings of the elongated object, without distortions.

A further advantage is that cutplanes along more than one structure can be visualized and examined together at the same time, without interpretation problems.

Yet another advantages of the present invention is that no interpretation problems are caused by the visualization, because the cutplanes are not geometrically distorted.

Furthermore additional information about the three-dimensional shape of the structure and its environment may be shown.

The present invention is in particular applicable in situations where the inside of an elongated structure needs to be inspected.

These and other aspects, features and advantages of which the invention is capable of will be apparent and elucidated from the following description of embodiments of the present invention, reference being made to the accompanying drawings, in which FIG. 1 is a schematic illustration of the positioning of a curved cutplane (left) and resulting visualization of the curved cross-section (right) according to the prior art;

The following description focuses on an illustrative embodiment of the present invention. However, it will be appreciated that the invention is not limited to this application but may be applied to many other elongated 3D elements, for instance tubular elements other than blood vessels, including for example the pulmonary tree.

The solution according to the present embodiments is to define and calculate local cutplanes substantially following the centerlines of elongated 3D structures and to visualize these cutplanes in a 3-dimensional context, even together with other structures of interest if that is required. However, the curved cutplane does not necessarily have to follow the centerline of an elongated 3D structure. It may follow any path through the structure, and even partly outside the structure. The purpose is most often to visualize an optimal cut through the imaged anatomy. Therefore, for elongated structures it makes often sense to cut along their centerline, but other options are not excluded in the context of certain embodiments of the invention. The orientation of the cutplane may for instance be defined as always perpendicular to the viewing direction, or may be independent of this viewing direction. The method is illustrated in FIG. 3 showing exemplary resulting images of visualizations achieved by an embodiment of the present invention.

Figure 1:
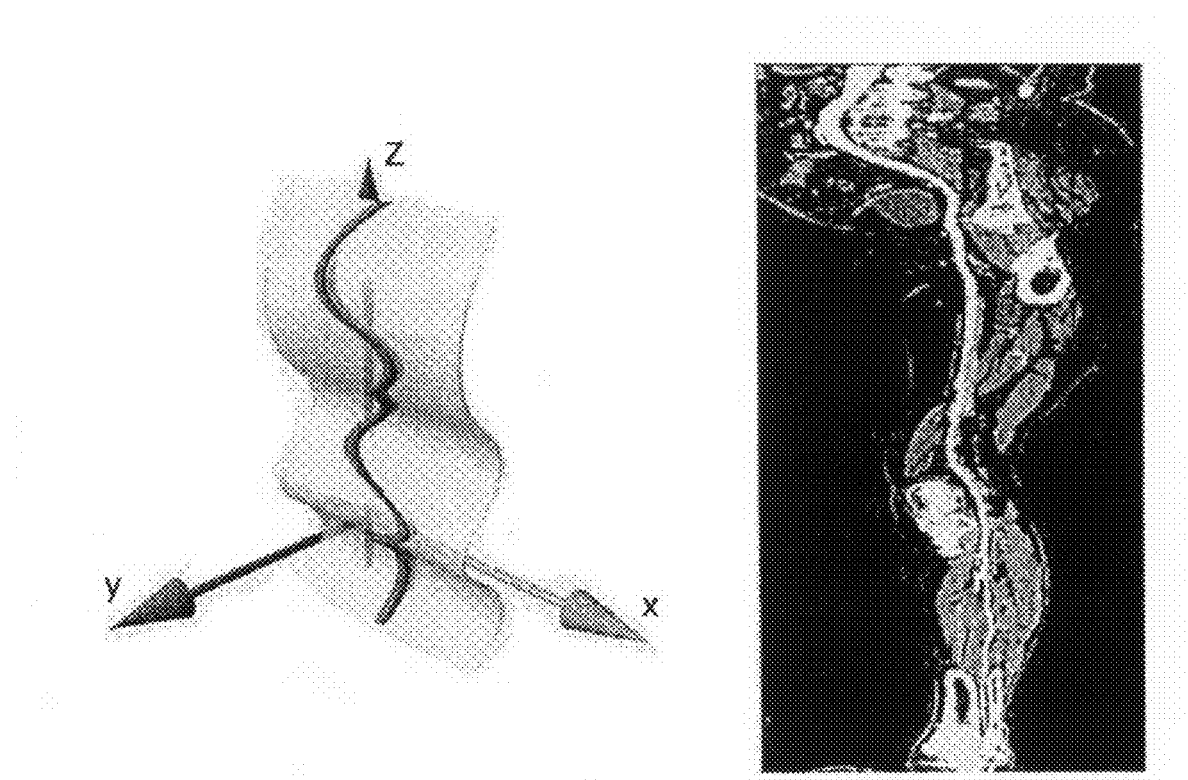
Figure 2:
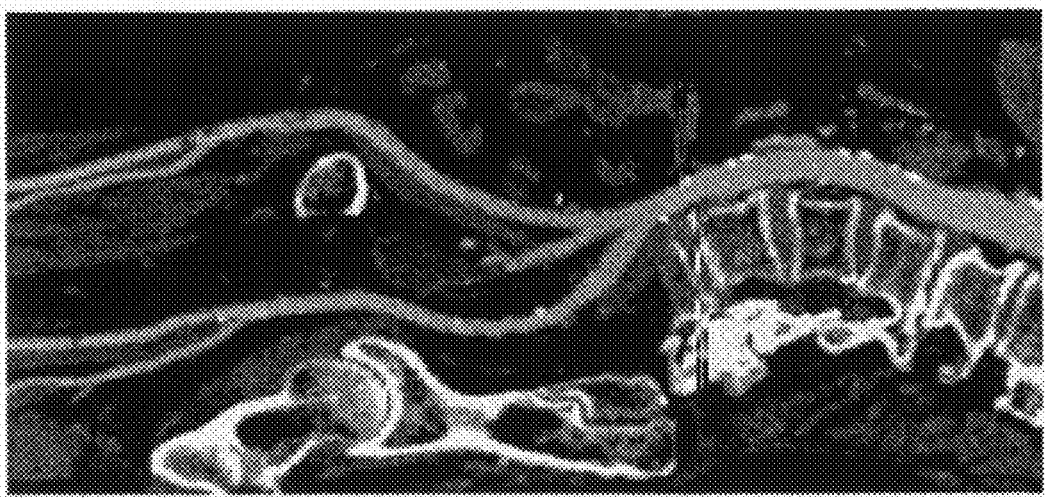
FIG. 2 is a medical image showing a curved cutplane through multiple vessel centerlines, which is shown as a flattened plane.
Figure 3:
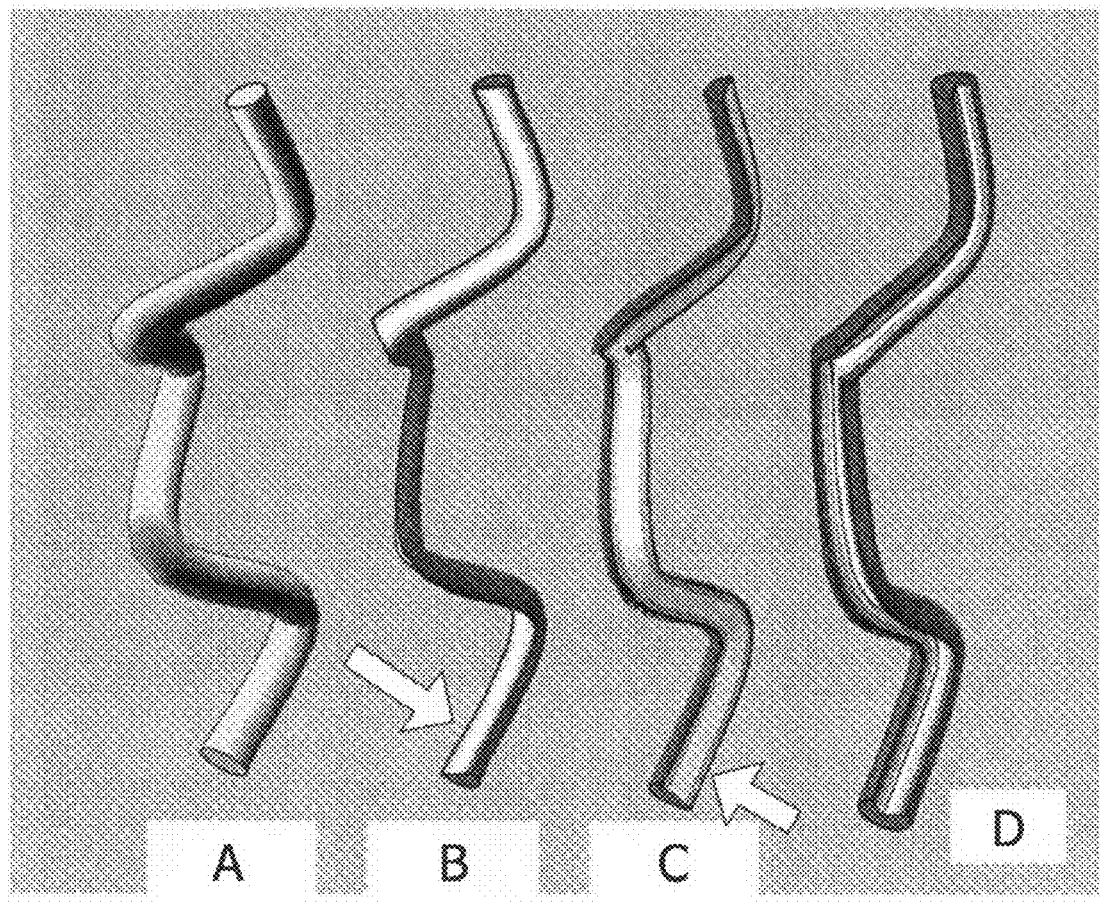
FIG. 3A shows an original 3D visualization of a vessel. 3B) and 3C) show—in a 3D context—curved cutplanes that have different orientations and follow the centerline. 3D) shows the vessel with a section cut out and two corresponding cutplanes in the same image.

FIG. 3A shows a schematic blood vessel as it may be visualized by common rendering methods, without a cutplane, showing only the three-dimensional shape of the vessel. There are many more or less different implementations of surface or volume rendering in use, as already has been elucidated above. However, the interior of the vessel is not visible which means that an inspection is not possible. For illustrative purposes, the vessel shown in FIG. 3 does not show a representation of a 'real' blood vessel. Moreover, it is intended to give an impression of what the application of the present invention is capable of producing, when suitably implemented. FIGS. 3B and 3C show the same vessel but now cut along the centerline of the vessel by a curved cutplane. This cutplane is displayed in a three-dimensional context on the blood vessel. The orientation of the cutplane is different for FIGS. 3B and 3C, as indicated by the arrows in these Figs., and may for instance be directed according to a viewing position. As shown in FIG. 3D, the cutplane does not have to be flat in one direction. In this FIG. 3D, the cutplane shape relates to the situation that a quarter section is cut out of the vessel, resulting in two surfaces of the cutplane.

With reference to FIG. 3, it becomes evident that the present invention provides an advantageous way of visualizing information on cutplanes through elongated curved structures without distortion and within a three-dimensional anatomical shape context. The cutplane shown in the rendered image remains a curved "plane", so that the orientation of the cutplane may show local orientation varying over the cutplane surface. Thus a more advantageous interpretation than previously is provided by the invention. The word plane usually suggest a flat or two-dimensional element. However, the term curved plane, referring to a curved cutplane is a three dimensional "plane" cutting through a three dimensional object. A curved cutplane may be considered as a part of a three dimensional surface, which even justifies the term three-dimensional cutplane for a curved cutplane.

The volumetric data used as input data for the present invention may be acquired in many different suitable ways, for instance by using a CT or MR scanner, an Ultrasound system, a rotational X-ray system, a PET or a SPECT scanner. The result of such an acquisition and the following processing, which is relevant for this invention is that a volume of measurements is provided.

Figure 4:
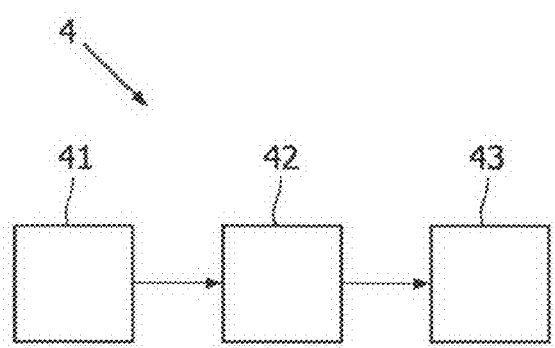
FIG. 4 is a schematic flowchart illustrating the steps of the method according to an embodiment of the present invention.

According to an embodiment of the method of the present invention, illustrated in FIG. 4, subvolumes are extracted from these data, which represent certain objects like organs or bone structures, in step 41. The skilled person is aware of suitable extraction techniques to be used for this step. Subsequently, the boundaries of these subvolumes are described, in step 42, by means of a surface description, for instance a geometrical description with a triangulated surface. A curved cutplane is then defined, cutting at least partly through said object, such as curved elongated three dimensional structures, and following a path substantially along said object. Finally, a '3D' image comprising the curved cutplanes is rendered from that subvolume description, in step 43, by projecting the surface elements to a projection plane, which for instance may be the view area on a computer screen or a print out. The view area is in most cases flat. Optionally for instance 3D screens may be used for presenting the rendered visualization. In this case for instance a special screen, such as an LCD screen, is used that may switch between a standard two-dimensional mode and a stereoscopic 3D mode in which a three-dimensional perspective is created on the screen. One solution to show such 3D images shows in that 3D mode two overlapping images, one showing the right-eye perspective and one showing the left-eye perspective. At the same time, the monitor switches on a filter that restricts the angle of light beams illuminating the screen. As a result, the light passing through pixels displaying the right-side perspective is projected toward the viewer's right eye, and the light hitting pixels displaying the left-side perspective is projected to the left eye. Alternatively, holographic projection methods may provide real 3D images.

Hence, the image that is rendered from a 3D data set for visualizing a curved elongated three dimensional structure. The image is rendered so that it comprises a visualization of the curved cutplane.

Alternatively, optical properties like color and opacity are assigned to each of the elements (voxels, measurements) in the data volume. Then imaginary rays are cast from the pixels of the projection plane into the data volume. The color of the pixels in the projection plane may then be related to the optical properties that the corresponding ray encounters when penetrating the data volume. User Interface options may be provided for defining simulated object properties like colors and opacities, viewing geometry, like direction from which the data volume is observed, as well as zoom and perspective, environment properties like simulated lightsources to enhance the perception of the object shapes, higher level object manipulations like switching objects on and off, merging geometrically described surfaces, placing the curved cutplanes in desired orientations, etc.

Figure 5:
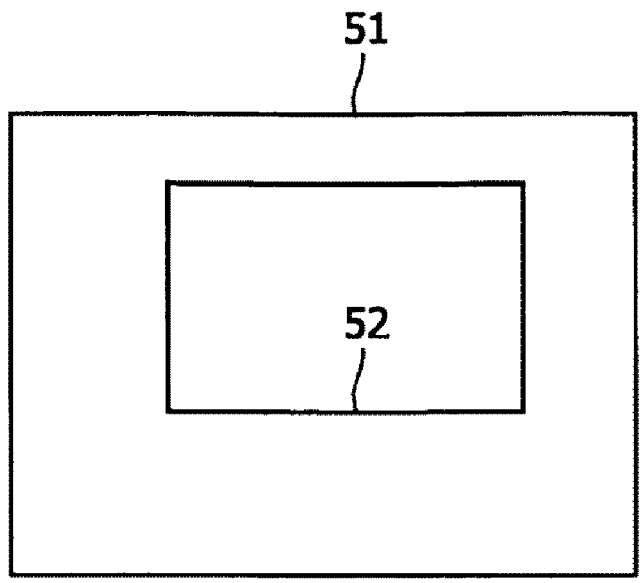
FIG. 5 is a schematic illustration of a medical workstation according to an embodiment of the invention.

FIG. 5 discloses a schematic illustration of a medical workstation according to an embodiment of the invention, namely, a medical workstation 51. The workstation is configured for visualizing a curved elongated 3D structure comprised in a three-dimensional (3D) medical image, and comprises means 52 for rendering a two dimensional image comprising at least one three-dimensional curved cutplane of said curved elongated structure, wherein said three-dimensional cutplane is curved. More precisely, the medical workstation 51 is configured for visualizing a curved elongated three dimensional (3D) structure comprised in the 3D medical image, and means 52 is configured for rendering an image from said 3D medical image, for visualizing said curved elongated three dimensional structure, wherein said rendered image comprises at least one rendered curved cutplane cutting at least partly through said visualized curved elongated three dimensional structure.

More precisely, the medical workstation 51 comprises means for providing a curved cutplane in said 3D data set cutting at least partly through said curved elongated three dimensional structure and following a path substantially along said three dimensional structure, and means 52 for rendering an image from said 3D data set for visualizing said curved elongated three dimensional structure such that said rendered image comprises said curved cutplane.

Figure 6:
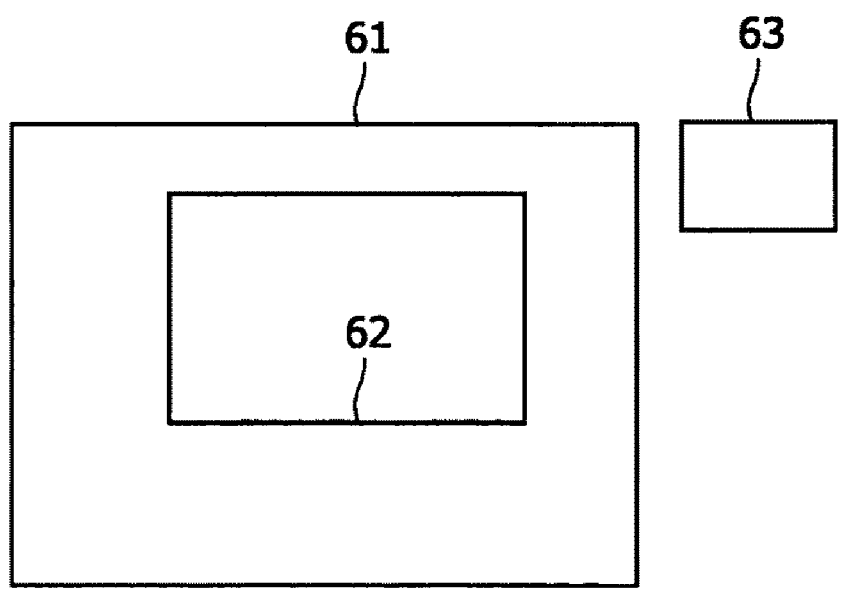
FIG. 6 is a schematic illustration of a computer program according to an embodiment of the invention.

FIG. 6 is a schematic illustration of a computer program according to a further embodiment of the invention. A computer-readable medium 61 has embodied thereon a computer program for visualizing a curved elongated structure comprised in a three-dimensional (3D) data set, such as a medical 3D image, for processing by a computer 63, e.g. comprised in workstation 51. The computer program comprises a code segment 62 for rendering a two dimensional image comprising at least one three-dimensional cutplane of said curved elongated structure, wherein said three-dimensional cutplane is curved. More precisely, the code segment 62 is configured for rendering an image from said 3D data set, for visualizing said curved elongated three dimensional structure, wherein said rendered image comprises at least one rendered curved cutplane cutting at least partly through said visualized curved elongated three dimensional structure. More precisely, the program comprises a code segment for providing a curved cutplane in said 3D data set cutting at least partly through said curved elongated three dimensional structure and following a path substantially along said three dimensional structure, and a code segment 62 for rendering an image from said 3D data set for visualizing said curved elongated three dimensional structure such that said rendered image comprises said curved cutplane.

The generation of these rendered images comprising curved cutplanes may be embedded in larger applications for diagnosis, computer assisted detection and quantification of abnormalities, planning and preparation of interventions, etc., wherein the curved cutplanes facilitate such procedures.

Applications and use of the above described method according to the invention are various and include exemplary fields such as aortic aneurisms or pulmonary diseases. Another example of an application that can benefit from the present invention, is the inspection of stenosis in blood vessels, for instance coronaries or carotids, or the large vessels in the extremities. Other examples are the inspection of aortic aneurisms or pulmonary disease.

Another example of application is the visualization of a complex pipe or tube structure in a mechanical device.

In general the present method being used will result in an image e.g. visible on a screen displaying the rendered visualization of a curved elongated structure in an image, wherein the rendered image comprises a curved cutplane, as detailed described above.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to a specific embodiments, it is not intended to be limited to the specific form set forth herein. Rather, the invention is limited only by the accompanying claims and, other embodiments than the specific above are equally possible within the scope of these appended claims, e.g. different rendering methods than those described above.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method of visualizing a curved elongated three dimensional (3D) structure comprised in a 3D data set, said method comprising:
   providing, by a computer, a 3D curved cutplane in said 3D data set cutting through said curved elongated three dimensional structure, the 3D curved cutplane following a path having a first portion which is along said three dimensional structure and a second portion which is outside said three dimensional structure, and
   rendering, by the computer, an image from said 3D data set for visualizing said curved elongated three dimensional structure such that said rendered image comprises said curved cutplane in a three-dimensional context, wherein said three-dimensional context comprises said at least one 3D rendered curved cutplane and at least a part of said curved elongated structure with a 3D rendered surface thereof.

2. The method according to claim 1, wherein said three-dimensional context comprises further structures comprised in said 3D data set.

3. The method according to claim 1, wherein said 3D data set is a medical 3D image and said curved elongated structure is a curved elongated organ of a mammal or animal.

4. The method according to claim 3, wherein said curved elongated organ is comprised in the group comprising a blood vessel, including a coronary vessel; a respiratory pathway; a gastrointestinal tract; or a part of the nervous, urologic or lymphatic system; of said mammal or animal.

5. The method according to claim 3, comprising visualizing an anomaly in said 3D curved cutplane through said curved elongated organ, including stenosis in blood vessels, including coronaries or carotids, or vessels in the extremities; aortic aneurisms; or pulmonary anomalies including bronchial restrictions.

6. The method according to claim 1, comprising orienting said 3D curved cutplane perpendicular to a viewing direction of said image, when rendering said image.

7. The method according to claim 1, said 3D curved cutplane having a curved cutplane surface, and said rendering comprising showing a local orientation of the curved cutplane varying over the cutplane surface with respect to a centerline of said curved elongated 3D structure.

8. The method according to claim 1, said 3D curved cutplane having a curved cutplane surface, and orienting said curved cutplane surface along a centerline of said curved elongated 3D structure.

9. The method according to claim 1, said 3D curved cutplane having a curved cutplane surface, and orienting said curved cutplane surface so that it follows an arbitrary path at least through said rendered curved elongated 3D structure or partly outside said rendered curved elongated 3D structure, wherein said arbitrary path along its length preferably has a non-constant distance to said centerline of said curved elongated 3D structure.

10. A medical workstation configured for visualizing a curved elongated three dimensional (3D) structure comprised in a 3D medical image, comprising:
    means for providing a 3D curved cutplane in said 3D data set cutting through said curved elongated three dimensional structure, the 3D curved cutplane following a path having a first portion which is along said three dimensional structure and a second portion which is outside said three dimensional structure, and
    means for rendering an image from said 3D data set for visualizing said curved elongated three dimensional structure stitch that said rendered image comprises said 3D curved cutplane and at least a part of said curved elongated structure with a 3D rendered surface thereof.

11. A non-transitory computer-readable medium having embodied thereon a computer program for visualizing a curved elongated three dimensional (3D) structure comprised in a 3D data set, preferably a medical 3D image, for processing by a computer, the computer program comprising:
    a code segment for providing a 3D curved cutplane in said 3D data set cutting through said curved elongated three dimensional structure, the 3D curved cutplane following a path having a first portion which is along said three dimensional structure and a second portion which is outside said three dimensional structure, and
    a code segment for rendering an image from said 3D data set for visualizing said curved elongated three dimensional structure such that said rendered image comprises said 3D curved cutplane and at least a part of said curved elongated structure with a 3D rendered surface thereof.

12. A non-transitory computer-readable medium having embodied thereon a computer program for visualizing a curved elongated three dimensional (3D) structure comprised in a 3D data set, preferably a medical 3D image, for processing by a computer, the computer program comprising:
    a code segment for providing a 3D curved cutplane in said 3D data set cutting through said curved elongated three dimensional structure, the 3D curved cutplane following a path having a first portion which is along said three dimensional structure and a second portion which is outside said three dimensional structure, and
    a code segment for rendering an image from said 3D data set for visualizing said curved elongated three dimensional structure such that said rendered image comprises said 3D curved cutplane and at least a part of said curved elongated structure with a 3D rendered surface thereof enabling carrying out of a method according to claim 1 by means of a workstation configured for visualizing a curved elongated three dimensional (3D) structure comprised in a 3D medical image, comprising:

means for providing the 3D curved cutplane in said 3D data set.

13. A medical image comprising a visualization of a curved cutplane rendered by a method of visualizing a curved elongated three dimensional (3D) structure comprised in a 3D data set, the method comprising:

providing, by a computer, a 3D curved cutplane in said 3D data set cutting through said curved elongated three dimensional structure, the 3D curved cutplane following a path having a first portion which is along said three dimensional structure and a second portion which is outside said three dimensional structure; and rendering, by the computer, an image from the 3D data set for visualizing the curved elongated three dimensional structure such that the rendered image comprises the 3D curved cutplane in a three-dimensional context, wherein the three-dimensional context comprises the at least one 3D rendered curved cutplane and at least a part of the curved elongated structure with a 3D rendered surface thereof.

14. The method according to claim 1, wherein the method is used for computer assisted detection, inspection, and quantification of abnormalities, planning and preparation of subsequent interventions or inspecting or detecting stenosis, aortic aneurisms or bronchial anomalies for subsequent treatment.

* * * * *